(12) United States Patent
Fleur

(10) Patent No.: US 10,380,036 B2
(45) Date of Patent: Aug. 13, 2019

(54) METHOD FOR FAST INITIALIZATION OF A TACTICAL DATA PROCESSING DEVICE

(71) Applicant: BULL SAS, Les Clayes-sous-Bois (FR)

(72) Inventor: Benjamin Fleur, Toulon (FR)

(73) Assignee: BULL SAS, Les Clayes-sous-Bois ( * ) Notice: Subject to any disclaimer, the term of this patent is extended or adjusted under 35 U.S.C. 154(b) by 228 days.

(21) Appl. No.: 15/383,143

(22) Filed: Dec. 19, 2016

(65) Prior Publication Data

US 2017/0177506 A1 Jun. 22, 2017

(30) Foreign Application Priority Data

Dec. 18, 2015 (FR) ...................................... 15 02630

(51) Int. Cl.
*G06F 9/44* (2018.01)
*G06F 12/14* (2006.01)
*G06F 9/4401* (2018.01)
*G06F 8/60* (2018.01)
*G06F 9/50* (2006.01)

(52) U.S. Cl.
CPC ............ *G06F 12/1408* (2013.01); *G06F 8/60* (2013.01); *G06F 9/4401* (2013.01); *G06F 9/5016* (2013.01); *G06F 2212/1052* (2013.01)

(58) Field of Classification Search
CPC ......... G06F 12/1408; G06F 2212/1052; G06F 8/60; G06F 9/4401; G06F 9/5016
See application file for complete search history.

(56) References Cited

U.S. PATENT DOCUMENTS

| 2005/0033728 | A1 | 2/2005 | James et al. |
| 2006/0015674 | A1* | 1/2006 | Murotake ............. G06F 9/4401 711/101 |
| 2011/0246981 | A1 | 10/2011 | Braun et al. |
| 2017/0161083 | A1* | 6/2017 | Park ...................... G06F 9/4406 |

FOREIGN PATENT DOCUMENTS

EP 1 657 645 A1 5/2006

OTHER PUBLICATIONS

Search Report as issued in French Patent Application No. 1502630, dated Oct. 7, 2016.

* cited by examiner

*Primary Examiner* — Fahmida Rahman
(74) *Attorney, Agent, or Firm* — Pillsbury Winthrop Shaw Pittman LLP

(57) ABSTRACT

A method for fast initialization of a tactical data processing device, includes producing a bootable installation medium suitable for a small set of data processing devices; unlocking a read interface of a medium to allow applications to be executed through the interface from a medium connected to the interface; connecting the installation medium to the unlocked read interface; boot-up of the tactical data processing device; selecting a profile from a list of possible profiles; executing an installation by the execution of a plurality of commands, wherein the plurality of commands depends on the selected profile; locking of a read interface of a medium to prohibit applications being executed through the interface.

9 Claims, 1 Drawing Sheet

METHOD FOR FAST INITIALIZATION OF A TACTICAL DATA PROCESSING DEVICE

CROSS-REFERENCE TO RELATED APPLICATIONS

This application claims priority to French Patent Application No. 1502630, filed Dec. 18, 2015, the entire content of which is incorporated herein by reference in its entirety.

FIELD

The field of the invention is that of the deployment of a configuration in a tactical data processing device. More specifically, the field of the invention is that of obtaining an operational device in a limited period. The field of the invention is also that of obtaining an operational device in a theatre of military operations.

Such a data processing device meets the prerequisites generally specified by a state for military systems.

In the present text the term "data processing device" is understood to mean any device capable of processing data which includes, non-restrictively, smartphones, tablets and desktop and laptop computers.

BACKGROUND

There are circumstances in which provision of a tactical data processing device is vital. Such circumstances are, for example, when armed forces are engaged in a theatre of operation. In these circumstances each unit engaged must have equipment which is appropriate for its mission, and which is up-to-date.

In practice three installation methods are known above all.

A first method is the traditional method in which an administrative user installs the processing device by undertaking the following steps:
  In an appropriate sequence, making the installation media of the various components required accessible in read mode; this relates in general to DVD disks, Blu-ray disks, removable disks, etc.
  For each medium, executing an installation program present on the medium;
  For each medium, answering the questions of the installation program.
  For each medium, undertaking the configuration to make the application(s) installed by the medium usable.

This first method therefore requires several media to be handled, and it also requires the attention of the user performing the initialization, who must answer correctly the questions posed to them by the installation program during the procedure. Many of these questions are specific to the IT field, and are unknown in the professional field of the person whom it is desired should undertake the initialization.

A second installation method consists in supplying, when possible, a file with answers to the questions. Such a file is associated with the installation program, which uses it as a set of parameters. The installation program then reads the answers to the questions in the file, which means that the user undertaking the installation does not have to do so.

Both these methods have major disadvantages. The first disadvantage is the fact of handling several media. This implies, in a potentially stressful environment, non-negligible risks of choosing the wrong medium, or of using the media in the wrong order.

It might be thought that this problem is simple to resolve: one need merely undertake an initialization once, and then create a binary image of the finalized initialization. All that would then be required would be to copy this binary image to the devices which must be initialized. However, the problem would only seemingly be resolved, since several images would have to be managed: one for each possible data processing device. I.e. one for each hardware configuration. This would therefore be equivalent to handling several media.

Once these solutions have been envisaged, it is found that their initialization times are too lengthy, in terms of the immobilization of the data processing device. It appears, after analysis, that the quantity of data which must be copied is very large: at least some ten Gigabytes which, depending on the performance of a communication interface, may represent as much as several hours of transmission.

The words installation and initialization are used. In this document an initialization is the action of making a device operational, i.e. of applying an initial configuration to it. An initialization of a device includes formatting of the storage system, and one or more installations of applications. Installation of a device does not necessarily imply formatting.

SUMMARY

An aspect of the invention seeks to remedy all or a proportion of the disadvantages of the state of the art identified above, and in particular to propose a system to enable the data copied during initialization to be limited, and to make such an initialization available to persons who are not computer maintenance experts.

To this end, an aspect of the invention relates to a method for fast initialization of a tactical data processing device, the method including:
  Production of a bootable installation medium suitable for a small set of data processing devices;
  Unlocking of a read interface of a medium to allow applications to be executed through the interface from a medium connected to the interface;
  Connection of the installation medium to the unlocked read interface;
  Boot-up of the tactical data processing device;
  Selection of a profile from a list of possible profiles;
  Execution of an installation by the execution of a plurality of commands, where the plurality of commands depends on the selected profile;
  Locking of a read interface of a medium to prohibit applications being executed through the interface.

In addition to the main characteristics which have just been mentioned in the preceding paragraph, the method according to one or more embodiments of the invention may have one or more of the following possible additional characteristics, considered individually or in technically possible combinations:
  One command installs an application;
  One command to install an application forces installation in silent mode;
  One command is to partition the storage system of the data processing device;
  One command encrypts all or part of the storage system of the data processing device;
  One command creates an account for managing the data processing device;
  The password of the management account is linked to the installation medium;

One command is for an action to configure an application

BRIEF DESCRIPTION OF THE FIGURES

Other characteristics and benefits of the invention will be seen clearly on reading the description below, with reference to the appended figures, which illustrate.

For greater clarity, identical or similar elements are identified by identical reference signs in all the figures.

The invention will be better understood on reading the description which follows, and on examining the figures accompanying it. These are shown as an indication only, and are not restrictive of the invention in any manner

DETAILED DESCRIPTION

Figure 1:
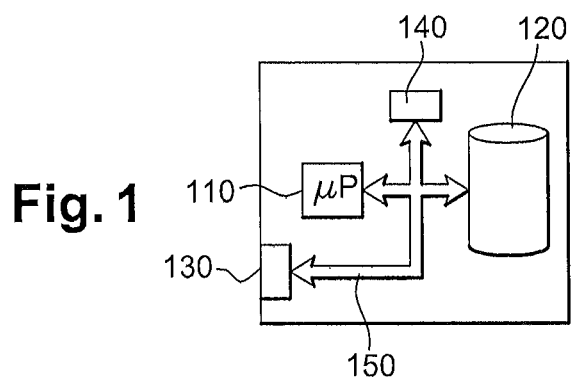
FIG. 1 shows a schematic view of a tactical data processing device.

FIG. 1 shows a tactical data processing device 100. Tactical data processing device 100 includes:

- A microprocessor 110; the microprocessor 110 includes one or more electronic circuits to perform its function(s);
- A non-transitory, tangible, storage system 120, for example a hard drive, whether local or remote, and whether simple or in a schema (for example RAID);
- A communication interface 130, for example a USB port or an optical media drive capable of allowing reading of a data medium;
- A microcode component 140 containing instruction codes and a configuration to boot up tactical data processing device 100.

Microprocessor 110 of tactical data processing device 100, storage system 120 of tactical data processing device 100, communication interface 130 of tactical data processing device 100 and microcode component 140 of tactical data processing device 100 are interconnected by a bus 150.

When an action is imparted to a device it is in fact performed by a microprocessor of the device controlled by instruction codes recorded in a memory of the device. If an action is imparted to an application it is in fact performed by a microprocessor of the device in a memory where the instruction codes for the application are recorded. When a device or an application transmits a message this message is transmitted via a communication interface of the device or of the application.

In an aspect of the invention, the aim is to enable rapid transfer of data read via the tactical data processing device's communication interface to the tactical data processing device's storage system. This data consists of:

- An operating system;
- At least one tactical application allowing management of all or part of a theatre of military operations;
- Configuration elements which make the applications usable.

Figure 2:
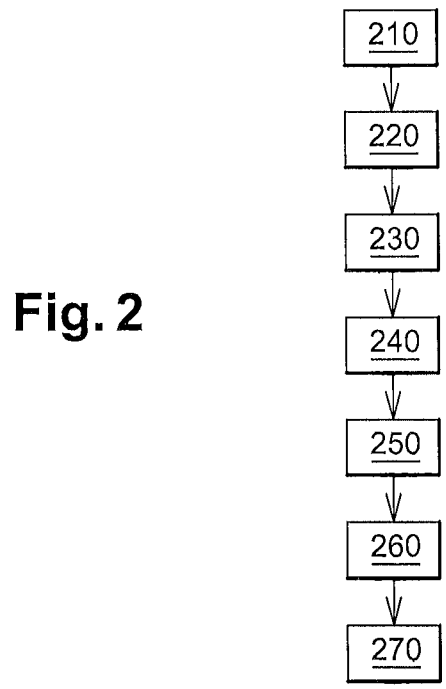
FIG. 2 shows an illustration of a the method according to an embodiment of the invention.

FIG. 2 shows a step 210 of production of a self-executing initialization medium suitable for a small set of data processing devices. If this initialization medium allows installations, it is also called an installation medium. This reduced set is also called a specific collection. This step 210 is a prior step which enables an installation medium to be obtained which is simplified compared to the medium of the technical field.

Indeed, in the technical field it is usual to resolve installation problems by adaptive universality. This means that when an installation media is produced it is sought to make it as universal as possible. I.e. it is sought to make it able to manage all possible hardware configurations. Similarly, when an installation is made from such a universal media all the data on the device where the installation is to take place is copied. This makes the installation adaptive: if the hardware configuration is changed after the installation then the drivers required for this change will probably be found among the data copied during the installation.

Conversely, in an embodiment of the invention certain problems are resolved through the specialization of the installation medium: it contains only the drivers and other relevant data for a specific hardware collection. This collection is known in principle since it has been described in a set of specifications used in developing the applications which are to be installed. This set of specifications is therefore used to establish a list of the software components required to be able to manage the tactical data processing devices listed in this collection. Such a list includes a list of hardware models and, for each model, a list of at least one version of these hardware models. A smaller number of configurations should therefore be catered for. This number is the cardinal of the list of versions. During an installation the hardware types are also detected, in order that actions specific to this hardware can be performed. This detection relates, for example, to:

- The input/output peripherals: the screen, whether or not a touch screen, pointing device, etc.
- Connectivity;
- Screen sizes;
- etc.

For a given model the hardware varies from one version to the next, for example the screen size, the size of the hard disk, the processor, etc. Different drivers are therefore required from one version of the model to the next.

For example, in step 210, the following are excluded from the installation medium:

- Drivers for hardware which will never be used with the tactical data processing devices;
- Character fonts which are not used by the tactical applications;
- Non-professional applications, such as games;
- etc.

The produced installation medium is a bootable medium, i.e. a medium from which a device may perform its boot sequence when it is switched on.

Step 210 of production of the installation medium is accomplished by technical operators whose profession is the production of installation media. When it has been produced the installation medium is given to those who should use it, and who have no particular knowledge in the computer maintenance field. These are the operational users whose profession is combat, not computer maintenance. In particular, the installation medium contains an installation script which is automatically executed when the tactical data processing device to which it is connected boots up. The characteristics of this script can be deduced from the following method description.

Step 210 of production of the installation medium is followed by a step 220 of unlocking of the read interface. In this step an operational user boots the tactical data processing device using a predetermined procedure, during which the executed instruction codes are read in the microcode component, allowing a menu to be entered from which the actions of communication interface 130 can be configured.

In unlocking step 220 the communication interface is configured to allow a boot-up from a medium connected to this communication interface.

Unlocking step 220 is followed by a step 230 of connection of the installation medium to the read interface. In this case "connect" means:
- Connecting an external hard drive or a USB drive to a USB port, or
- Inserting a disk in an optical drive, or
- Accessing the medium via a network connection, in which case the installation is then accomplished using the PXE protocol.

Step 230 of connection of the medium is followed by a step 240 of booting up the tactical data processing device. At this point it should be noted that this may involve a reboot; the aim of the step is to force the tactical data processing device to perform its boot sequence in the new configuration determined in the previous steps. The result of this boot-up sequence is that the tactical data processing device considers the installation medium to be its boot partition and executes instruction codes recorded on the installation medium. From this step the initialization process is controlled by the instruction codes of the installation medium, and more specifically by the installation script.

This is followed by a step 250, in which the installation script causes a dialogue box to be displayed, requesting the operational user to choose from among a list of profiles. These profiles correspond to the various roles of the operational users. This is not therefore an IT choice, but a professional choice which the operational user is able to understand. When this choice has been made the next step follows, and the installation continues silently, i.e. without requiring any more input from the operational user.

This is then followed by a step 260 of execution of an installation, in which a plurality of commands is executed, the executed commands being dependent on the choice made in the previous step.

At least one of the commands executed in the installation's execution step involves the installation of an operating system. This installation of the operating system is fast since:
- The installation medium has been designed specially and contains a reduced quantity of data to be copied to implement the installation;
- All the options are pre-set using script parameters, and therefore no input is required during installation.

At least one of the commands executed in the installation's execution step involves the installation of a professional application. This command is such that installation occurs in silent mode.

In cases in which silent mode is not available the input required involves professional questions, or the replies are suggested.

In a variant of the invention one of the commands executed in the step of execution of the installation involves establishment of a configuration for use of an application which has been or will be installed. Such a configuration contains, for example:
- A database, regardless of its form: relational, hierarchical or other. This may be a database corresponding to a database engine, or a set of files, for example files in XML format.
- A value for an environment variable;
- A task schedule;
- Configuration of a service;
- Creation of a shortcut or a menu;
- etc.

In a variant of the invention one of the commands executed in the step of execution of the installation involves a partitioning of the tactical data processing device's storage system. This partitioning is accompanied by formatting.

In a variant of the invention one of the commands executed in the step of execution of the installation involves an encryption of all or part of the data processing device's storage means. A "part" is understood to mean a partition, a directory or a file.

In a variant of the invention one of the commands executed in the step of execution of the installation involves the creation of an account allowing the user to open a session on the tactical data processing device when the installation has completed.

The executed commands can therefore be of different kinds. Some of these relate to a hardware detection step, in particular driver installations to manage peripherals such as screens, AirCards or pointing devices The created account is, for example, an administrator account. The password for the created account is obtained from the installation medium, and each installation medium has a different password. The password is recorded encrypted on the installation medium when the medium is produced.

After all the commands of the installation script have been executed a step 270 follows in which the communication interface is locked. This is the reverse step to the unlocking step.

In a variant of the invention the unlocking and locking steps are conditional on a particular procedure, for example entry of a password.

It will be appreciated by one skilled in the art that the disclosed method and system described herein represent a solution to the technological problem currently faced by designers for deploying a configuration in a tactical data processing device and for obtaining an operational device in a limited period.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description.

Reference in the specification to "one implementation" or "an implementation" or "an embodiment" or "an aspect" means that a particular feature, structure, or characteristic described in connection with the implementation, embodiment or aspect is included in at least one implementation of the description. The appearances of the phrase "in an embodiment" in various places in the specification are not necessarily all referring to the same implementation.

Some portions of the detailed descriptions are presented in terms of algorithms and symbolic representations of operations within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing," "executing," or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus is specially constructed for the required purposes, or it comprises a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In an implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for fast initialization of a tactical data processing device, the method comprising:
   producing a bootable installation medium suitable for a reduced set of data processing devices;
   unlocking a read interface of a first medium of the tactical data processing device to allow applications to be executed through the interface from a second medium connected to the interface;
   connecting the installation medium to the unlocked read interface;
   booting the tactical data processing device from the bootable installation medium, wherein the booting comprises detecting, in response to execution of instructions of a script on the bootable installation medium by a processor of the tactical data processing device, a hardware configuration of the tactical data processing device from the reduced set of data processing devices;
   selecting a profile from a list of possible profiles, the profile corresponding to an operational role of the tactical data processing device;
   executing an installation on the first medium by the execution of a plurality of commands of the script on the bootable installation medium by the processor of the tactical data processing device, wherein the plurality of commands depend on the detected hardware configuration and on the selected, profile; and
   locking the read interface of the first medium to prohibit applications being executed through the interface, wherein booting the tactical data processing device from the first medium in response to execution of the installation causes the tactical data processing device to effectuate operations in accordance with the selected profile.

2. The method for fast initialization of a tactical data processing device according to claim 1, wherein a command involves the installation of an application.

3. The method for fast initialization of a tactical data processing device according to claim 2, wherein the command to install an application forces the installation into silent mode.

4. The method for fast initialization of a tactical data processing device according to claim 1, wherein a command involves the partitioning of a storage system of the data processing device.

5. The method for fast initialization of a tactical data processing device according to claim 1, wherein a command involves encryption of all or part of a storage system of the data processing device.

6. The method for fast initialization of a tactical data processing device according to claim 1, wherein a command involves a creation of an account for managing the data processing device.

7. The method for fast initialization of a tactical data processing device according to claim 6, wherein a password of a management account is related to the installation medium.

8. The method for fast initialization of a tactical data processing device according to claim 1, wherein a command involves an action to configure an application.

9. The method for fast initialization of a tactical data processing device according to claim 1, wherein producing a bootable installation medium comprises producing a plurality of bootable installation mediums, the method further comprising:

recording different encrypted account information to different ones of the plurality bootable installation mediums, wherein a command involves a creation of an account for managing the data processing device, the account based on encrypted account information recorded to the respective bootable installation medium and accessible by credentials different from credentials operable to access accounts created by other ones of the plurality of bootable installation mediums.

* * * * *